United States Patent
Balasubramanian et al.

(10) Patent No.: US 11,953,585 B2
(45) Date of Patent: Apr. 9, 2024

(54) SECURE RANGING WITH PASSIVE DEVICES

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Junyi Li, Fairless Hills, PA (US); Sourjya Dutta, San Diego, CA (US); Preeti Kumari, San Diego, CA (US); Hong Cheng, Basking Ridge, NJ (US); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 17/452,513

(22) Filed: Oct. 27, 2021

(65) Prior Publication Data
US 2023/0130477 A1    Apr. 27, 2023

(51) Int. Cl.
*G01S 13/87*        (2006.01)
*G01S 13/75*        (2006.01)
(Continued)

(52) U.S. Cl.
CPC .......... *G01S 13/876* (2013.01); *G01S 13/751* (2013.01); *H04W 12/041* (2021.01)

(58) Field of Classification Search
CPC ...... G01S 13/876; G01S 13/751; G01S 11/02; G01S 13/765; G01S 5/0273;
(Continued)

(56) References Cited

U.S. PATENT DOCUMENTS

| | | | |
|---|---|---|---|
| 2021/0297206 A1 | 9/2021 | Manolakos et al. | |
| 2022/0338002 A1* | 10/2022 | Laddu | H04L 9/0875 |
| 2023/0258759 A1* | 8/2023 | Wang | G01S 1/08 |
| | | | 455/456.1 |

OTHER PUBLICATIONS

Ghatak G., et al., "On the Placement of Intelligent Surfaces for RSSI-Based Ranging in Min-Wave Networks", IEEE Communications Letters, IEEE Service Center, Piscataway, NJ, US, vol. 25, No. 6, Mar. 4, 2021, pp. 2043-2047, XP011858912, ISSN: 1089-7798, DOI: 10.1109/LCOMM.2021.3063918 [retrieved on Jun. 9, 2021], Abstract.

(Continued)

*Primary Examiner* — Bernarr E Gregory
*Assistant Examiner* — Juliana Cross
(74) *Attorney, Agent, or Firm* — Harrity & Harrity, LLP

(57) ABSTRACT

Various aspects of the present disclosure generally relate to wireless communication. In some aspects, a first user equipment (UE) may transmit, to a second UE via reflection by one or more passive devices, a first reference signal (RS) that is based at least in part on a shared first key that corresponds to a configuration of the one or more passive devices. The first UE may receive, from the second UE via reflection, a second RS that is based at least in part on the first key. The first UE may generate a second key based at least in part on a measurement of the second RS. The first UE may transmit a positioning reference signal that is based at least in part on the second key and that is associated with a measurement of a range between the first UE and the second UE. Numerous other aspects are described.

27 Claims, 11 Drawing Sheets

(51) Int. Cl.
*H04W 12/04* (2021.01)
*H04W 12/041* (2021.01)

(58) Field of Classification Search
CPC ........ G01S 5/0236; G01S 5/10; G01S 5/0205; G01S 5/0072; G01S 5/0036; H04W 12/041; H04W 4/40; H04W 12/63; H04B 7/04013; H04B 7/145; H04L 5/0037; H04L 5/0051; H04L 63/1466; H04L 5/0048; H04L 5/0094; H04L 5/0053; H04L 5/005; H04L 27/261; H04L 9/08
See application file for complete search history.

(56) References Cited

OTHER PUBLICATIONS

International Search Report and Written Opinion—PCT/US2022/075682—ISA/EPO—dated Dec. 6, 2022.
Zhang J., et al., "Positioning with Dual Reconfigurable Intelligent Surfaces in Millimeter-Wave MIMO Systems", 2020 IEEE/CIC International Conference on Communications in China (ICCC), IEEE, Aug. 9, 2020, XP033853278, pp. 800-805, DOI: 10.1109/ICCC49849.2020.9238887, the whole document, pp. 1-3, 6, abstract, p. 800, paragraph I-p. 801, paragraph II, p. 802, paragraph III.

* cited by examiner

US 11,953,585 B2

SECURE RANGING WITH PASSIVE DEVICES

FIELD OF THE DISCLOSURE

Aspects of the present disclosure generally relate to wireless communication and to techniques and apparatuses for secure ranging with passive devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting, to a second UE via reflection by one or more passive devices, a first reference signal (RS) that is based at least in part on a first key that is shared with the second UE and that corresponds to a configuration of the one or more passive devices. The method may include receiving, from the second UE via reflection by the one or more passive devices and in association with the transmitting of the first RS, a second RS that is based at least in part on the first key. The method may include generating a second key based at least in part on a measurement of the second RS on a channel that is established between the first UE and the second UE according to the configuration of the one or more passive devices. The method may include transmitting a positioning reference signal (PRS) that is based at least in part on the second key and that is associated with a measurement of a range between the first UE and the second UE.

Some aspects described herein relate to a method of wireless communication performed by a second UE. The method may include transmitting, to a first UE via reflection by one or more passive devices, a first RS that is based at least in part on a first key that is shared with the first UE and that corresponds to a configuration of the one or more passive devices. The method may include receiving, from the first UE via reflection by the one or more passive devices and in association with the transmitting of the first RS, a second RS that is based at least in part on the first key. The method may include generating a second key based at least in part on a measurement of the second RS on a channel that is established between the first UE and the second UE according to the configuration of the one or more passive devices. The method may include receiving a PRS that includes an indication of being generated with the second key. The method may include verifying, based on the second key, whether generation of the PRS is secure.

Some aspects described herein relate to a first UE for wireless communication. The first UE may include memory, one or more processors coupled to the memory, and instructions stored in the memory and executable by the one or more processors. The instructions may be executable by the one or more processors to cause the first UE to transmit, to a second UE via reflection by one or more passive devices, a first RS that is based at least in part on a first key that is shared with the second UE and that corresponds to a configuration of the one or more passive devices. The instructions may be executable by the one or more processors to cause the first UE to receive, from the second UE via reflection by the one or more passive devices and in association with the transmitting of the first RS, a second RS that is based at least in part on the first key. The instructions may be executable by the one or more processors to cause the first user equipment to generate a second key based at least in part on a measurement of the second RS on a channel that is established between the first UE and the second UE according to the configuration of the one or more passive devices. The instructions may be executable by the one or more processors to cause the first user equipment to transmit a PRS that is based at least in part on the second key and that is associated with a measurement of a range between the first UE and the second UE.

Some aspects described herein relate to a second UE for wireless communication. The second UE may include memory, one or more processors coupled to the memory, and instructions stored in the memory and executable by the one or more processors. The instructions may be executable by the one or more processors to cause the second UE to transmit, to a first UE via reflection by one or more passive devices, a first RS that is based at least in part on a first key that is shared with the first UE and that corresponds to a configuration of the one or more passive devices. The instructions may be executable by the one or more processors to cause the second UE to receive, from the first UE via reflection by the one or more passive devices and in association with the transmitting of the first RS, a second RS that is based at least in part on the first key. The instructions may be executable by the one or more processors to cause the second UE to generate a second key based at least in part on a measurement of the second RS on a channel that is established between the first UE and the second UE according to the configuration of the one or more passive devices. The instructions may be executable by the one or more processors to cause the second UE to receive a PRS that includes an indication of being generated with the second key. The instructions may be executable by the one or more processors to cause the second UE to verify, based on the second key, whether generation of the PRS is secure.

Some aspects described herein relate to a non-transitory computer-readable medium that stores one or more instructions for wireless communication by a first UE. The one or more instructions, when executed by one or more processors of the first UE, may cause the first UE to transmit, to a second UE via reflection by one or more passive devices, a first RS that is based at least in part on a first key that is shared with the second UE and that corresponds to a configuration of the one or more passive devices. The one or more instructions, when executed by one or more processors of the first UE, may cause the first UE to receive, from the second UE via reflection by the one or more passive devices and in association with the transmitting of the first RS, a second RS that is based at least in part on the first key. The one or more instructions, when executed by one or more processors of the first UE, may cause the first UE to generate a second key based at least in part on a measurement of the second RS on a channel that is established between the first UE and the second UE according to the configuration of the one or more passive devices. The one or more instructions, when executed by one or more processors of the first UE, may cause the first UE to transmit a PRS that is based at least in part on the second key and that is associated with a measurement of a range between the first UE and the second UE.

Some aspects described herein relate to a non-transitory computer-readable medium that stores one or more instructions for wireless communication by a second UE. The one or more instructions, when executed by one or more processors of the second UE, may cause the second UE to transmit, to a first UE via reflection by one or more passive devices, a first RS that is based at least in part on a first key that is shared with the first UE and that corresponds to a configuration of the one or more passive devices. The one or more instructions, when executed by one or more processors of the second UE, may cause the second UE to receive, from the first UE via reflection by the one or more passive devices and in association with the transmitting of the first RS, a second RS that is based at least in part on the first key. The one or more instructions, when executed by one or more processors of the second UE, may cause the second UE to generate a second key based at least in part on a measurement of the second RS on a channel that is established between the first UE and the second UE according to the configuration of the one or more passive devices. The one or more instructions, when executed by one or more processors of the second UE, may cause the second UE to receive a PRS that includes an indication of being generated with the second key. The one or more instructions, when executed by one or more processors of the second UE, may cause the second UE to verify, based on the second key, whether generation of the PRS is secure.

Some aspects described herein relate to an apparatus for wireless communication. The apparatus may include means for transmitting, to another apparatus via reflection by one or more passive devices, a first RS that is based at least in part on a first key that is shared with the other apparatus and that corresponds to a configuration of the one or more passive devices. The apparatus may include means for receiving, from the other apparatus via reflection by the one or more passive devices and in association with the transmitting of the first RS, a second RS that is based at least in part on the first key. The apparatus may include means for generating a second key based at least in part on a measurement of the second RS on a channel that is established between the apparatus and the other apparatus according to the configuration of the one or more passive devices. The apparatus may include means for transmitting a PRS that is based at least in part on the second key and that is associated with a measurement of a range between the apparatus and the other apparatus.

Some aspects described herein relate to an apparatus for wireless communication. The apparatus may include means for transmitting, to another apparatus via reflection by one or more passive devices, a first RS that is based at least in part on a first key that is shared with the other apparatus and that corresponds to a configuration of the one or more passive devices. The apparatus may include means for receiving, from the other apparatus via reflection by the one or more passive devices and in association with the transmitting of the first RS, a second RS that is based at least in part on the first key. The apparatus may include means for generating a second key based at least in part on a measurement of the second RS on a channel that is established between the apparatus and the other apparatus according to the configuration of the one or more passive devices. The apparatus may include means for receiving a PRS that includes an indication of being generated with the second key. The apparatus may include means for verifying, based on the second key, whether generation of the PRS is secure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
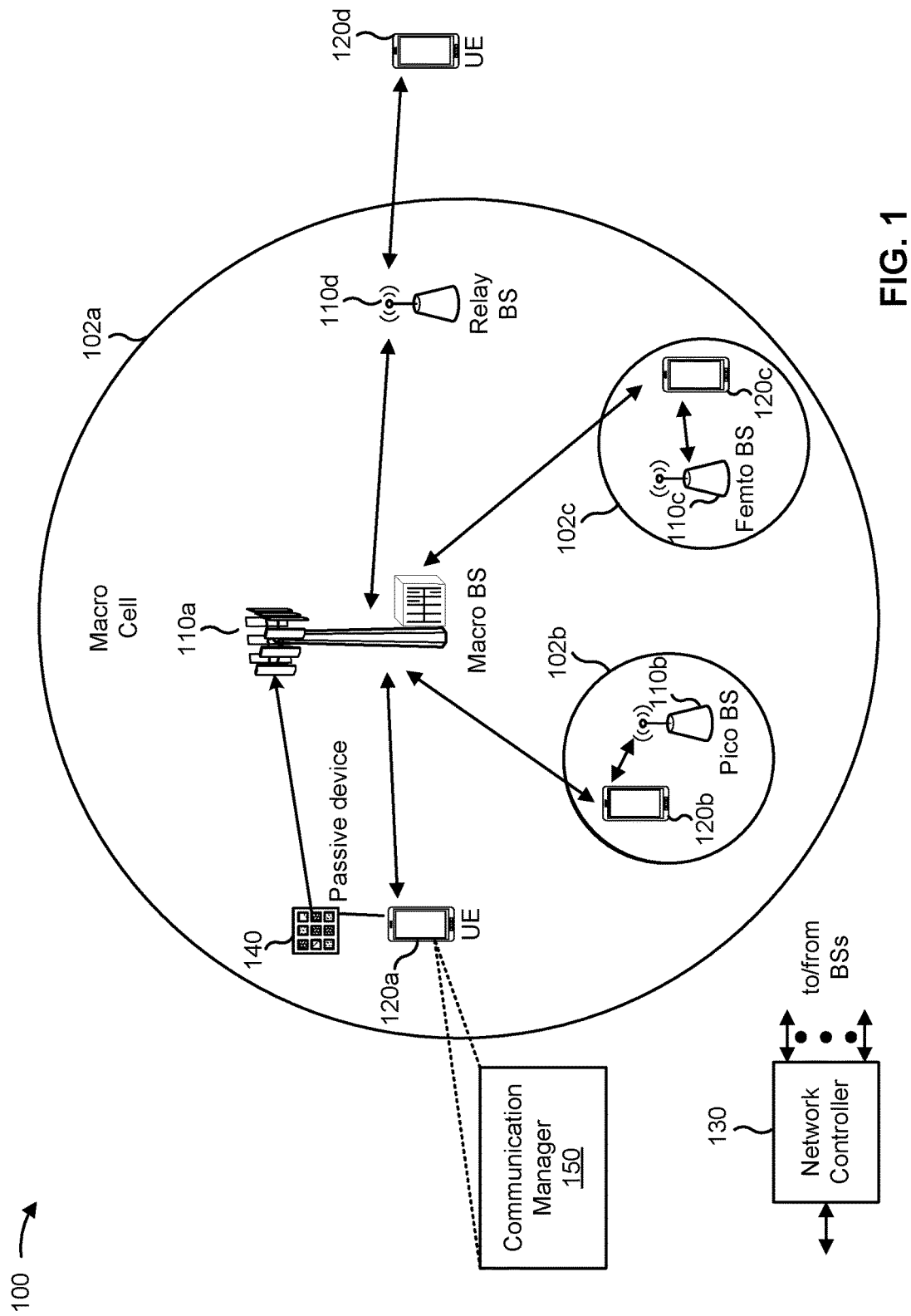
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller may couple to a set of BSs and may provide coordination and control for these BSs. The network controller may communicate with the BSs via a backhaul. The BSs may also communicate with one another directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Wireless network 100 shows a first device (e.g., UE 120*a*, base station 110) that may communicate with a second device (e.g., base station 110, UE 120*a*) directly or by reflecting signals via a passive device 140 (e.g., a reconfigurable intelligent surface (RIS)). The first device may be a transmitting UE and the second device may be a receiving UE, because the transmitting UE is transmitting a reference signal to the receiving UE. This may be at the request of the base station.

In some aspects, a first UE (e.g., UE 120) may include a communication manager 150. As described in more detail elsewhere herein, the communication manager 150 may transmit, to a second UE via reflection by one or more passive devices, a first reference signal (RS) that is based at least in part on a first key that is shared with the second UE and that corresponds to a configuration of the one or more passive devices. The communication manager 150 may receive, from the second UE via reflection by the one or more passive devices and in association with the transmitting of the first RS, a second RS that is based at least in part on the first key. The communication manager 150 may generate a second key based at least in part on a measurement of the second RS on a channel that is established between the first UE and the second UE according to the configuration of the one or more passive devices. The communication manager 150 may transmit a positioning reference signal (PRS) that is based at least in part on the second key and that is associated with a measurement of a range between the first UE and the second UE. Additionally, or alternatively, the communication manager 150 may perform one or more other operations described herein.

In some aspects, a second UE (e.g., UE 120) may include a communication manager 150. As described in more detail elsewhere herein, the communication manager 150 may transmit, to a first UE via reflection by one or more passive devices, a first RS that is based at least in part on a first key that is shared with the first UE and that corresponds to a configuration of the one or more passive devices. The communication manager 150 may receive, from the first UE via reflection by the one or more passive devices and in association with the transmitting of the first RS, a second RS that is based at least in part on the first key. The communication manager 150 may generate a second key based at least in part on a measurement of the second RS on a channel that is established between the first UE and the second UE according to the configuration of the one or more passive devices and receive a PRS that includes an indication of being generated with the second key. The communication manager 150 may verify, using the second key, whether generation of the PRS is secure. Additionally, or alternatively, the communication manager 150 may perform one or more other operations described herein.

As indicated above, FIG. 1 is provided as an example. Other examples may differ from what is described with regard to FIG. 1.

Figure 2:
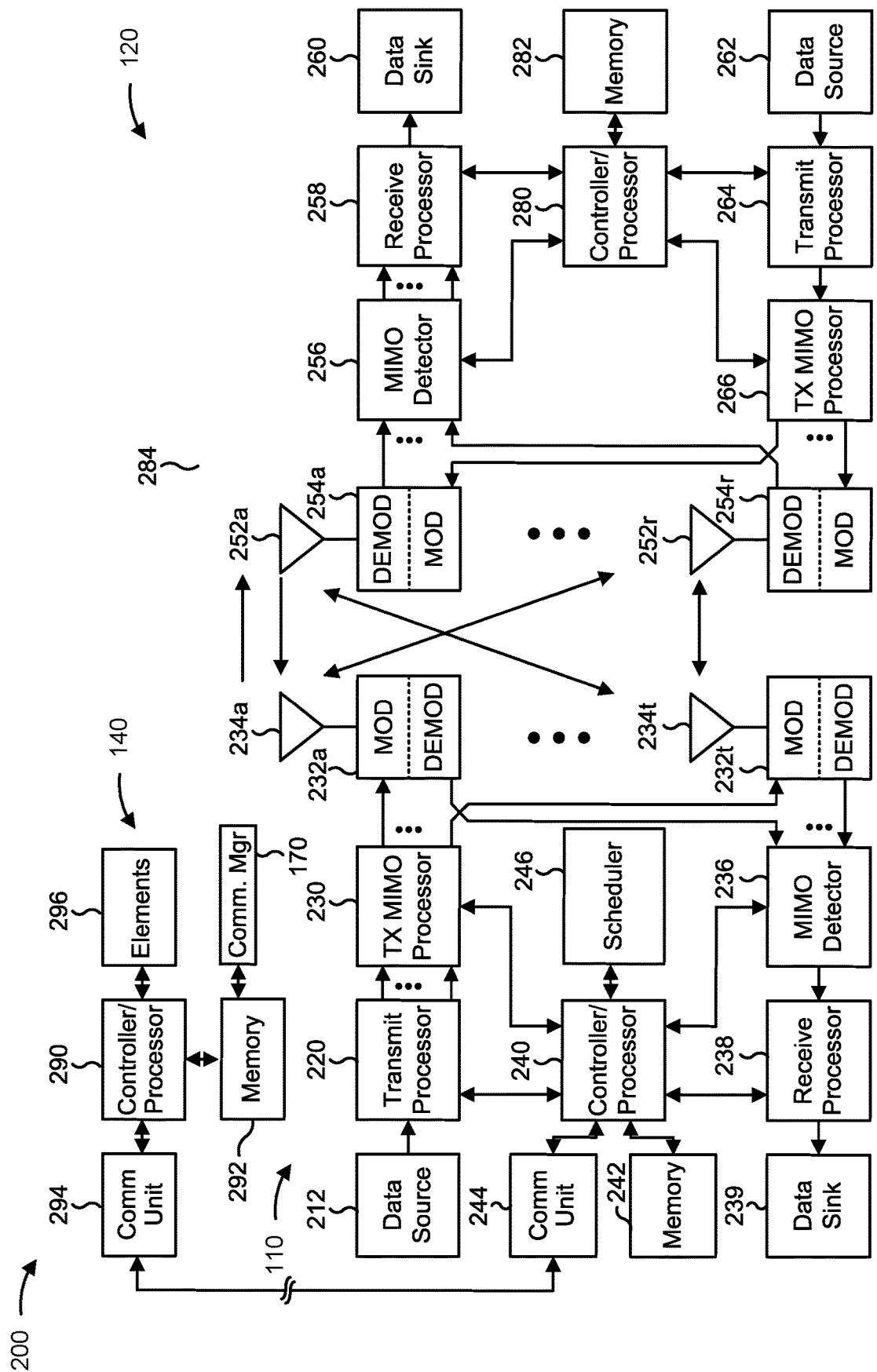
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with T antennas 234*a* through 234*t*, and the UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of the UE 120 may be included in a housing 284.

The passive device 140 may include communication unit 294, controller/processor 290, memory 292, and surface elements 296. The controller/processor 290 may control a configuration (e.g., reflective direction) of the surface elements 296 by applying voltage to specific elements of the surface elements 296. The passive device 140 may communicate with the base station 110 via the communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-11).

Controller/processor 240 of the base station 110, controller/processor 280 of the UE 120, controller/processor 290 of the passive device 140, and/or any other component(s) of FIG. 2 may perform one or more techniques associated with measuring links associated with a passive device, as described in more detail elsewhere herein. For example, controller/processor 240 of base station 110, controller/processor 280 of the UE 120, controller/processor 290 of the passive device 140, and/or any other component(s) of FIG. 2 may perform or direct operations of, for example, process 800 of FIG. 8, process 900 of FIG. 9, and/or other processes as described herein. Memories 242, 282, and 292 may store data and program codes for the base station 110, the UE 120, and the passive device 140, respectively. In some aspects, memory 242, memory 282, and/or memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the passive device 140, and/or the UE 120 may cause the one or more processors, the base station 110, the passive device 140, and/or the UE 120 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a first UE (e.g., UE 120) includes means for transmitting, to a second UE via reflection by one or more passive devices, a first RS that is based at least in part on a first key that is shared with the second UE and that corresponds to a configuration of the one or more passive devices; means for receiving, from the second UE via reflection by the one or more passive devices and in association with the transmitting of the first RS, a second RS that is based at least in part on the first key; means for generating a second key based at least in part on a measurement of the second RS on a channel that is established between the first UE and the second UE according to the configuration of the one or more passive devices; and/or means for transmitting a PRS that is based at least in part on the second key and that is associated with a measurement of a range between the first UE and the second UE. The means for the first UE to perform operations described herein may include, for example, one or more of communication manager 150, antenna 252, modem 254, MIMO detector 256, receive processor 258, transmit processor 264, TX MIMO processor 266, controller/processor 280, or memory 282.

In some aspects, a second UE (e.g., UE 120) includes means for transmitting, to a first UE via reflection by one or more passive devices, a first RS that is based at least in part on a first key that is shared with the first UE and that corresponds to a configuration of the one or more passive devices; means for receiving, from the first UE via reflection by the one or more passive devices and in association with the transmitting of the first RS, a second RS that is based at least in part on the first key; means for generating a second key based at least in part on a measurement of the second RS on a channel that is established between the first UE and the second UE according to the configuration of the one or more passive devices; means for receiving a PRS that includes an indication of being generated with the second key; and/or means for verifying, using the second key, whether generation of the PRS is secure. The means for the second UE to perform operations described herein may include, for example, one or more of communication manager 150, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
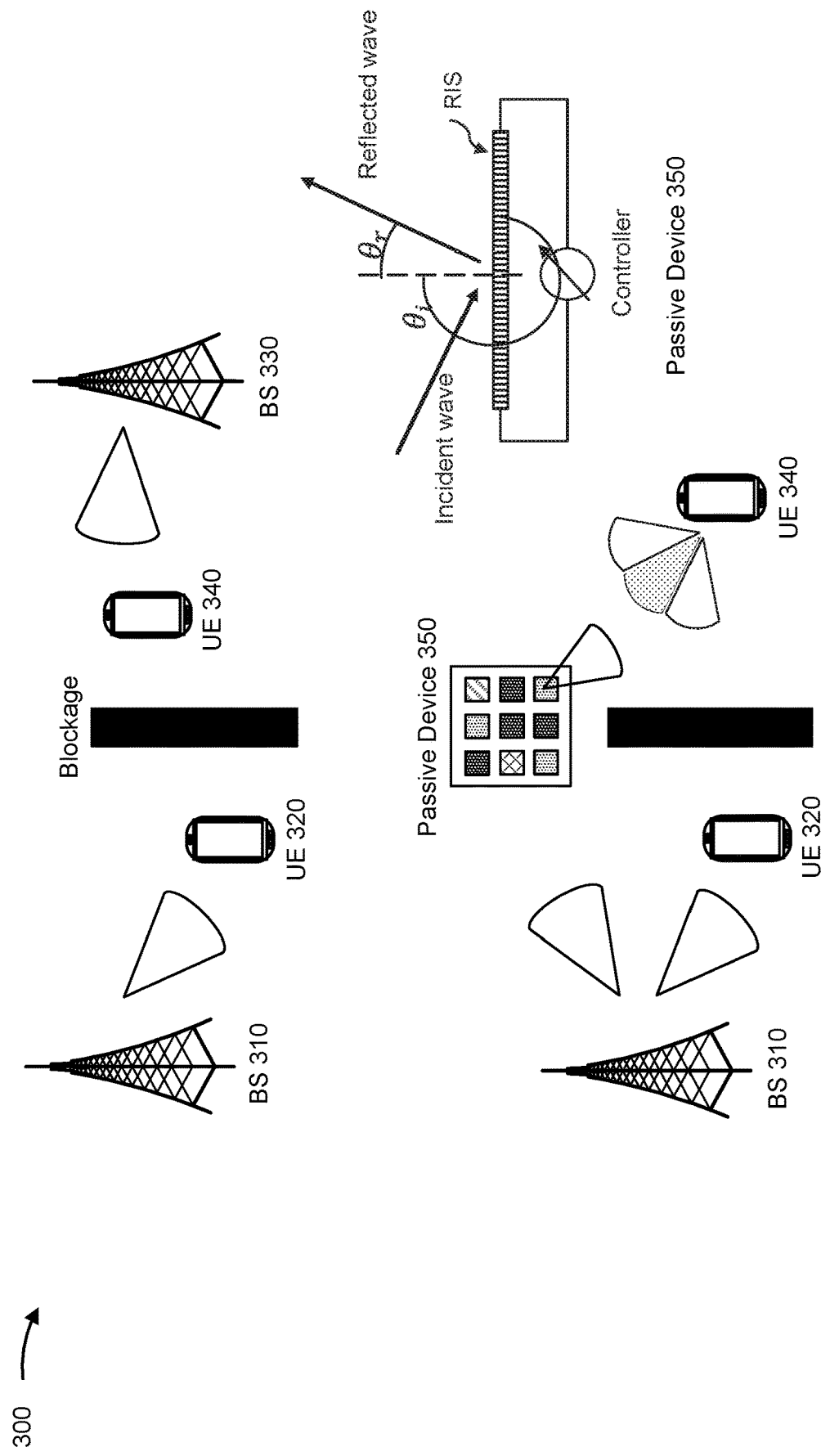
FIG. 3 is a diagram illustrating an example of using a passive device, in accordance with the present disclosure.

FIG. 3 is a diagram illustrating an example 300 of using a passive device, in accordance with the present disclosure. Example 300 shows a base station 310 (e.g., BS 110) that may communicate with a UE 320 (e.g., UE 120), and a BS 330 (e.g., BS 110) that may communicate with UE 340 (e.g., UE 120).

A network may have antennas that are grouped together at a transmitter or receiver, in order to increase throughput. The grouping of antennas may be referred to as "massive MIMO." Massive MIMO may use active antenna units (AAUs) to achieve high beamforming gain. An AAU may combine an antenna, a radio, a tower-mounted amplifier, a feeder, and/or jumper functionalities into a single unit. An AAU may include an individual radio frequency (RF) chain for each antenna port.

There may be barriers to massive MIMO. The transmission of signals may be blocked by buildings, natural topography, or other blocking structures. For example, BS 310 may transmit signals to UE 320, but BS 310 may not be able to transmit signals to UE 340. As shown in example 300, there is some type of blockage between BS 310 and UE 340. UE 340 may instead be served by BS 330.

In order to resolve transmission issues due to the blockage, the network may use a passive device 350 (e.g., passive device 140). The passive device 350 may be a device that forwards, relays, repeats, or reflects in a passive or near passive manner. The passive device 350 may be configured as a RIS. A RIS may be a two-dimensional surface of engineered material whose properties are reconfigurable rather than static. The engineered material may contain integrated electronic circuits and software that enable the control of a wireless medium by altering an impedance of the surface or a portion of the surface. The change in impedance may alter a phase shift and/or an angle of reflection. Scattering, absorption, reflection, or diffraction properties may be changed with time and controlled by the software. A RIS may act as a reflective lens. In one example, a RIS may include large arrays of inexpensive antennas spaced half of a wavelength apart. In another example, a RIS may include metamaterial-based planar or conformal large surfaces whose elements (e.g., square elements) have sizes and inter-distances that are smaller than the wavelength. Each of the elements may have a configured impedance or other surface properties that are controlled by a voltage to the element. A RIS may also be referred to as a "software-controlled metasurface" or an "intelligent reflecting surface".

The passive device 350, when configured to operate as a RIS, may not have antennas or RF chains of its own, but may include a large number of small, low-cost elements on a surface to passively reflect incident signals transmitted from BS 310. A controller of the passive device 350 may control the elements on the surface, and the surface may act as a phased array. The passive device 350 may be a smart device that is configured to use a specific angle of reflection for the signals. BS 310 may use a controller to control, as part of a reflective configuration, the angle of reflection (angle of arrival $\theta_i$ for an incident wave, angle of departure $\theta_r$ for reflected wave), an amplitude, a phase, and/or a width of the elements of the passive device 350 by controlling a voltage to each of the elements. The reflective configuration may also correspond to analog beamforming weights or coefficients that are provided by the passive device when reflecting signals from one device to another. The reflective configuration may also be referred to as an "MS reflection configuration," an "MS reflection matrix," or a "P-MIMO configuration." In sum, the passive device 350 may help to control a propagation environment with less power consumption than AAUs. Passive devices may even replace AAUs in the propagation environment. MIMO that uses passive devices may be referred to as "passive MIMO" or "P-MIMO". The passive device 350 may be also referred to as a "passive node" or a "P-MIMO device".

In some aspects, BS 310 may configure the passive device 350 by sending a control signal with information for configuring the properties and/or timing of the elements. For example, BS 310 may transmit a set of beam weights to the passive device 350 through explicit signaling (e.g., radio resource control (RRC) signaling) instead of using beam sweeping.

In some aspects, the BS 310 may transmit a control signal to the passive device 350 for operation of the passive device, and the passive device 350 may provide information back to the BS 310. For example, the passive device 350 may provide a few bits of RIS-side information, such as an indication of an acknowledgement (ACK) or a negative acknowledgment (NACK) of the control signal. The information may also indicate quality of the channel.

As indicated above, FIG. 3 is provided as an example. Other examples may differ from what is described with regard to FIG. 3.

Figure 4:
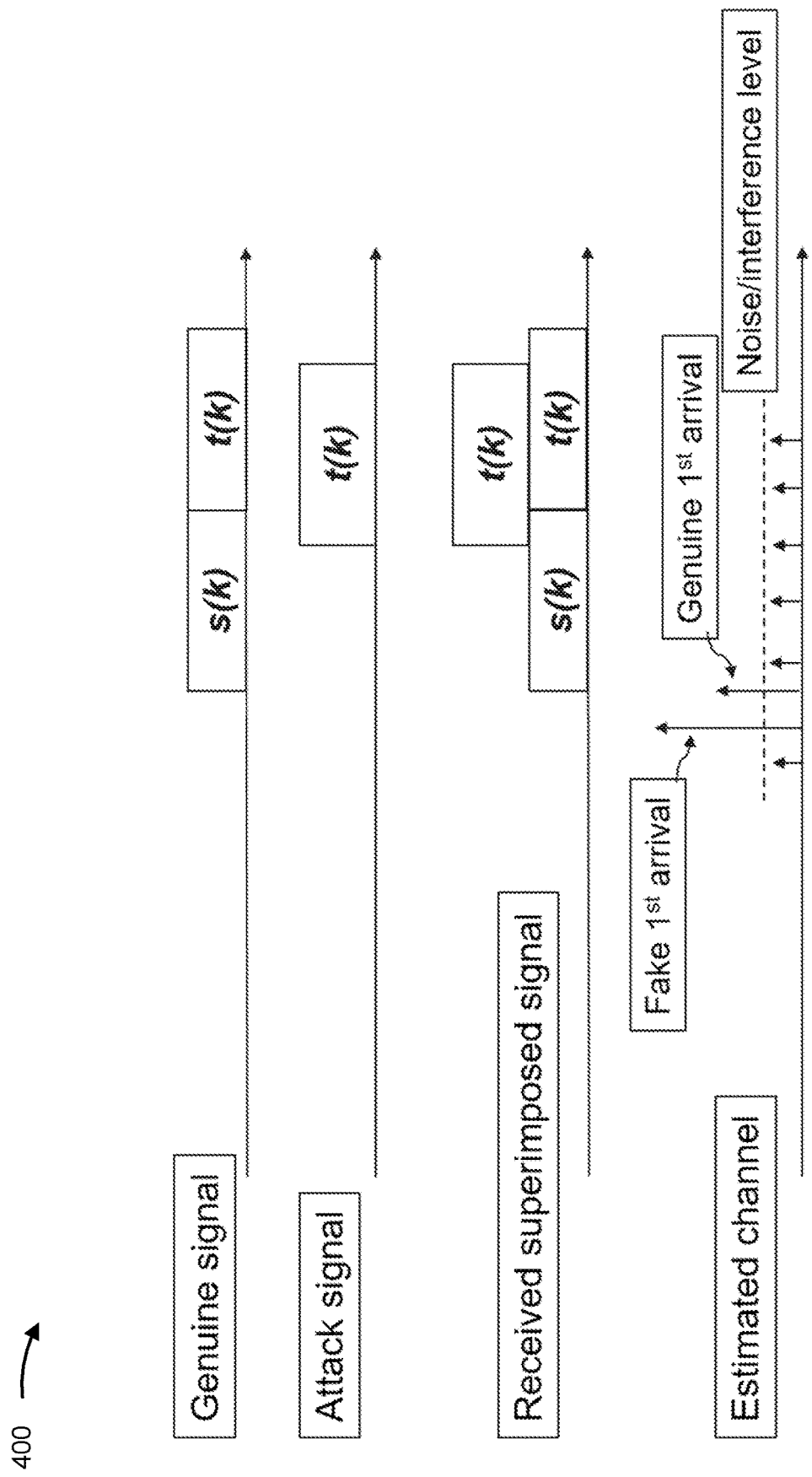
FIG. 4 is a diagram illustrating an example of positioning reference signals, in accordance with the present disclosure.

FIG. 4 is a diagram illustrating an example 400 of PRSs, in accordance with the present disclosure.

Ranging involves an ability to determine a distance between two wireless devices. An example of a ranging system may include a vehicle system that uses a key fob for remotely locking and unlocking the doors of a vehicle and for starting the vehicle. The key fob may transmit wireless signals to another device over a short or intermediate range. A first UE in the key fob and a second UE in the vehicle system may use a PRS to calculate the range (distance) between the first UE (key fob) and the second UE (vehicle system).

The first UE and the second UE may use the range to provide security for wireless signals transmitted between the first UE and the second UE. For secure ranging systems, it is important that a "man-in-the-middle" device does not spoof a PRS to make it appear that the range between the first UE and the second UE is less than the actual distance. The middle-man may detect the PRS from the first UE and transmit a time-advanced PRS on top of the actual PRS to the second UE. For example, as shown in example 400, a genuine signal may include an initial part s(k) and a latter part t(k). The middle-man may use the initial part s(k) to predict the latter part t(k). The middle-man may use the predicted latter part t(k) as an attack signal. The second UE may receive the attack signal superimposed onto the genuine signal. The middle-man may time advance the attack signal (with a slightly increased power) such that the fake first arrival of the attack signal is before the genuine first arrival of the genuine signal. The second UE may think that the genuine signal has arrived earlier. Because the range is a function of time, the second UE may think that the first UE is closer, and within the range when the vehicle is allowed to unlock and start the vehicle. In other words, by spoofing the latter part of the signal with a fake range, the operator of the middle-man device may steal the vehicle.

According to various aspects described herein, the first UE and the second UE may randomize the sequence of the PRS signal in such a way that only the legitimate transmitter and the legitimate receiver know the actual range, and the middle-man eavesdropper should not be able to estimate the range. The first UE and the second UE may secure the range by using a key that is shared between the first UE and the second UE and that changes over time. The first UE may transmit a PRS (common to both the first UE and the second UE) for the second UE to measure the channel. The second UE may transmit the common PRS to the first UE to measure the channel (the channel remains constant during this measurement phase). The first UE and the second UE may each generate the same secret key as follows. Let h(k) denote the channel measurement for subcarrier k, and let N be the number of subcarriers. Let $$\theta_k = \tan^{-1}\left(\frac{imag(h(k))}{real(h(k))}\right)$$

and be the channel phase for subcarrier k. Let $f_Q(\theta_k)=q$, if $$\theta_k \in \left[\frac{2\pi(q-1)}{Q}, \frac{2\pi q}{Q}\right],$$

q=1, ... Q, where Q is the quantity of quantization levels. The first UE and the second UE may generate the shared key $S=[f_Q(\theta_1), f_Q(\theta_2) \ldots f_Q(\theta_N)]$. The key generation between the first UE and the second UE may create common channel randomness that creates greater uncertainty for any middleman that may be eavesdropping on the legitimate first UE and second UE.

As indicated above, FIG. 4 is provided as an example. Other examples may differ from what is described with regard to FIG. 4.

Figure 5:
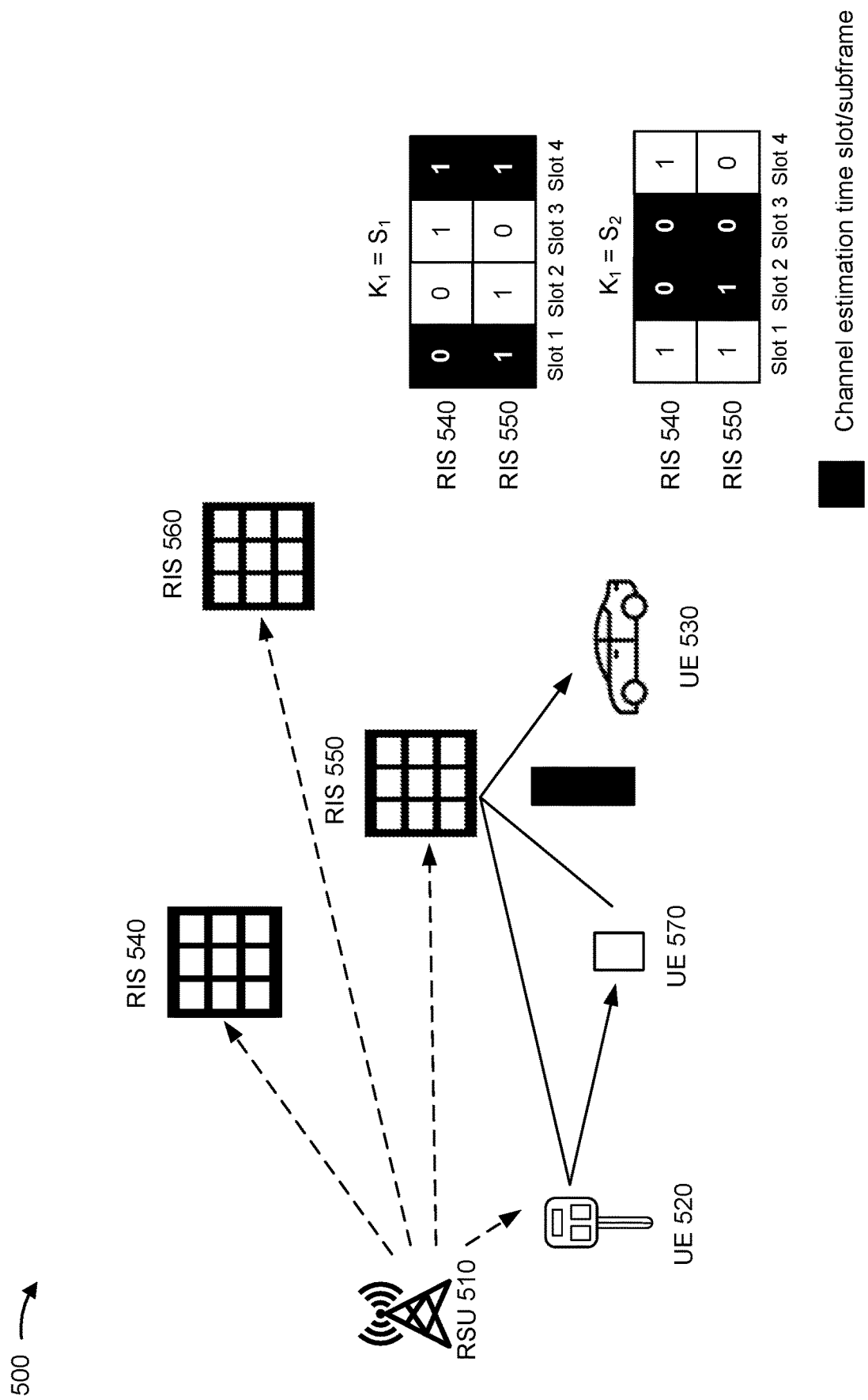
FIG. 5 is a diagram illustrating an example of generating a key when passive devices are involved, in accordance with the present disclosure.

FIG. 5 is a diagram illustrating an example 500 of generating a key when passive devices are involved, in accordance with the present disclosure. A roadside unit (RSU) 510 (e.g., BS 110) may communicate with a UE 520 (e.g., UE 120, UE 340) or a UE 530 (e.g., UE 120, UE 340) via a passive device, such as RIS 540 (e.g., passive device 350), RIS 550, RIS 560, or a combination thereof. UE 520 may be, for example, in a key fob that operates with UE 530 in a vehicle system to provide security for the vehicle. UE 520 and UE 530 may be considered legitimate (authorized) devices. There may be another UE 570 that is acting as an eavesdropper or a hacker.

UE 520 and UE 530 may coordinate to provide a two-layer scheme for secure ranging when using passive devices. The first layer involves the first key $K_1$ that is shared between the first UE and the second UE and that corresponds to a configuration of RIS 540, RIS 550, and RIS 560. The configuration may include a pattern of activation and deactivation of RIS 540, RIS 550, and RIS 560, where on or off states are mapped to specific slots or subframes in a time window. For example, as shown for a first value $S_1$ of the first key $K_1$, RIS 540 is off and RIS 550 is on in slot 1, RIS 540 is off and RIS 550 is on in slot 2, RIS 540 is on and RIS 550 is off in slot 3, and RIS 540 is on and RIS 550 is on in slot 4. The shaded slots of the configuration indicated by the first key $K_1$ indicate when UE 520 and UE 530 are to perform channel estimation or other measurements on the common reciprocal channel between UE 520 and UE 530. For the first value $S_1$ of the first key $K_1$, UE 520 and UE 530 are to perform channel estimation at slot 1 and slot 4. The channel estimation may be used for generating a second key $K_2$.

As shown for a second value $S_2$ of the first key $K_1$, RIS 540 is on and RIS 550 is on in slot 1, RIS 540 is off and RIS 550 is on in slot 2, RIS 540 is off and RIS 550 is off in slot 3, and RIS 540 is on and RIS 550 is off in slot 4. For the second value $S_2$ of the first key $K_1$, UE 520 and UE 530 are to perform channel estimation at slot 2 and slot 3. The RSU 510 may share values of the first key $K_1$ only with legitimate UEs and passive devices, such as UE 520, UE 530, RIS 540, RIS 550, and RIS 560.

In addition to on and off patterns and slots for measurements, the RSU 510 may configure each RIS with a reflection configuration indicated by the first key $K_1$. Each reflection configuration may include a configuration of analog beam forming weights that control a reflection angle of the RIS.

RIS 540, RIS 550, and RIS 560 may each receive the first key $K_1$ and configure itself to operate according to a configuration indicated by the first key $K_1$. This may include activating or deactivating in specified slots. This may also include using a reflection configuration (e.g., adjusting analog beamforming weights) in specified slots. A RIS may be preconfigured with multiple possible configurations and the first key $K_1$ may indicate one of the configurations with an index or some other value.

UE 520 may reflect signals via one or more RISs, depending on the configuration for a given slot (or symbol). Example 500 shows a configuration where RIS 540 and RIS 560 are deactivated for a slot, and UE 520 reflects a signal to UE 530 via RIS 550. UE 570 may be attempting to spoof the signal from UE 520.

As indicated above, FIG. 5 is provided as an example. Other examples may differ from what is described with regard to FIG. 5.

Figure 6:
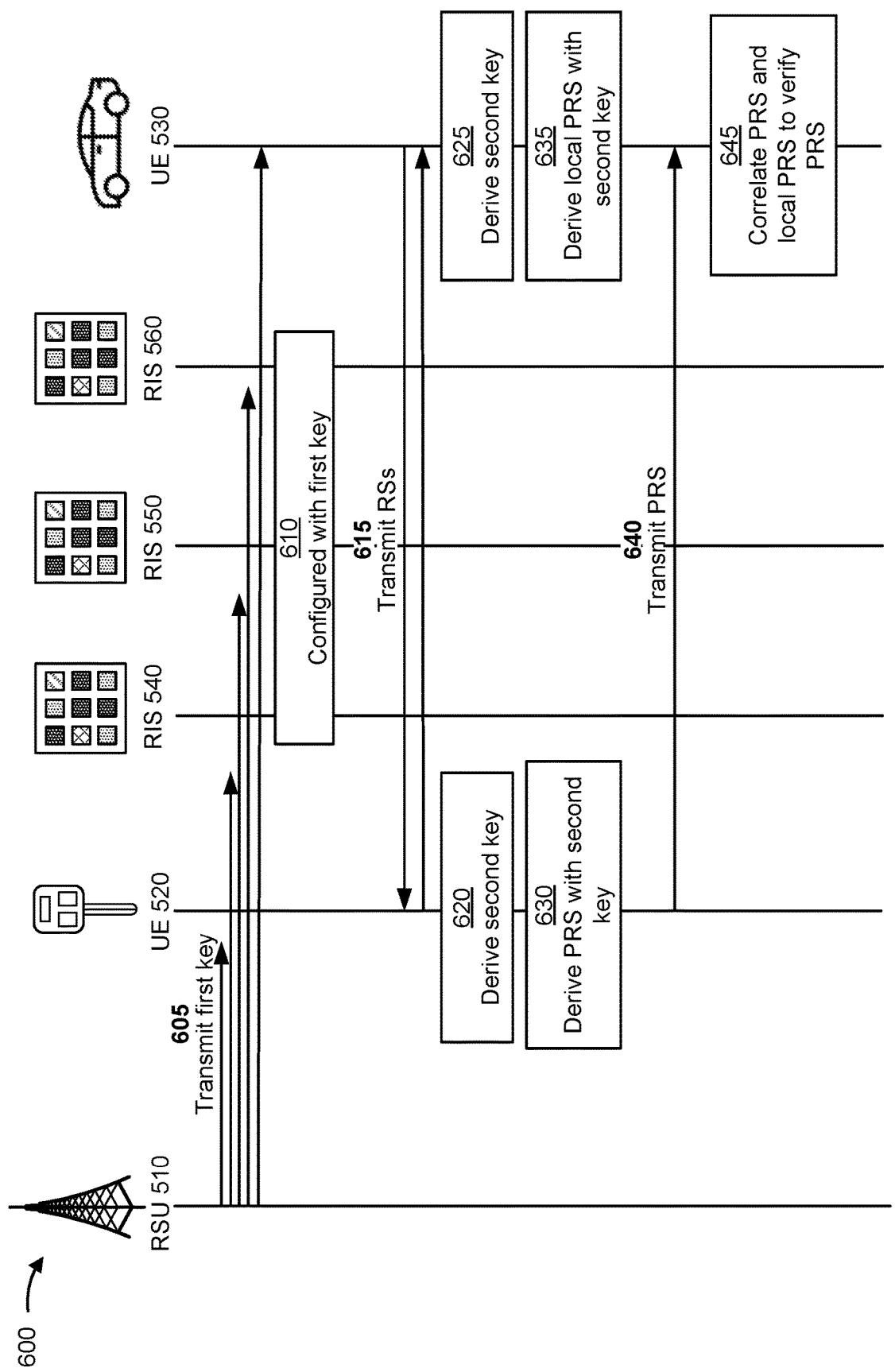
FIG. 6 is a diagram illustrating an example of secure ranging, in accordance with the present disclosure.

FIG. 6 is a diagram illustrating an example 600 of secure ranging, in accordance with the present disclosure. Example 600 shows a call flow of RSU 510, UE 520, UE 530, RIS 540, RIS 550, and RIS 560. Though not specifically shown in example 600, signals from UE 520 may be reflected to UE 530 via one or more of RIS 540, RIS 550, or RIS 560. Signals may also be reflected from UE 530 to UE 520.

As part of the first layer of the two-layer scheme for secure ranging described in connection with FIG. 5, the RSU 510 may transmit the first key $K_1$ to UE 520 and UE 530 and to RIS 540, RIS 550, and RIS 560, among other passive devices, as shown by reference number 605. The RSU 510 may transmit the first key $K_1$ via a radio resource control (RRC) message on a dedicated RRC connection between the UEs and the RISs. The RSU 510 may transmit the first key $K_1$ using the respective public keys of RIS 540, RIS 550, RIS 560, UE 520, and UE 530, and each device may decode the first key $K_1$ using respective private keys. Alternatively, UE 520 or UE 530 may initiate a secure ranging session and distribute the first key $K_1$, or each of the devices may derive the first key $K_1$ using identifiers of the devices.

As shown by reference number 610, each of RIS 540, RIS 550, and RIS 560 may be configured by the first key $K_1$. The configuration may include a timing of when each of RIS 540, RIS 550, and RIS 560 is activated or deactivated. For example, RIS 540, RIS 550, and/or RIS 560 may be on or off for each time slot of multiple time slots of a time window, according to the configuration of the passive devices indicated by the first key $K_1$. As shown by reference number 615, UE 520 may transmit an SL-RS (e.g., channel state information reference signal (CSI-RS)) to UE 530, and UE 530 may transmit an SL-RS to UE 520. Each of the SL-RSs may be reflected by RIS 540, RIS 550, and/or RIS 560 according to the configuration of the passive devices at the time slot. Different combinations of active RISs may be specified for each time slot. Each of RIS 540, RIS 550, and/or RIS 560 may be configured with a reflection configuration (e.g., analog beamforming weights) indicated by the first key $K_1$ or any other information associated with the first key $K_1$.

As shown by reference number 620, UE 520 may derive a second key $K_2$ based at least in part on measuring the SL-RS on the sidelink channel from UE 530 during the time slot, if the first key $K_1$ indicates that UE 520 is to perform a channel measurement at the time slot. The channel measurement may include measuring the phase or amplitude of an SL-RS at each of one or more subcarriers (subcarrier phases) of the SL-RS. The second key $K_2$ may be generated to include, for example, a concatenation of the phase or amplitude measurements, such as $m_i=[f_Q(\theta_1), f_Q(\theta_2) \ldots f_Q(\theta_N)]$ measured during the time slot. The second key $K_2$ may be generated to includes a concatenation of measurements made over multiple slots. For example, for $K_1=S_2$, where measurements are performed in slot 2 and slot 3, the second key $K_2$ may be $[m_2\ m_3]$, where $m_2$, $m_3$ are the keys obtained by mapping the channel phases in each of N subcarriers in slot 2 and slot 3, respectively. The second key $K_2$ may be selected, from among multiple candidate key values, to map to a particular measurement value. As shown by reference number 625, UE 530 may derive the second key $K_2$ based at least in part on the SL-RS received from UE 520 on the reciprocal channel at the same time slot.

As shown by reference number 630, UE 520 may derive a sequence of a PRS based at least in part on the second key $K_2$ that is derived using the configuration of passives devices indicated by the first key $K_1$. The PRS may infer the range between UE 520 and UE 530. As shown by reference number 635, UE 530 may derive a sequence of a local PRS based at least in part on the second key $K_2$. In some aspects, UE 520 and UE 530 may use a preconfigured mapping between the second key $K_2$ and a sequence to be used for the PRS.

In some aspects, the mapping may be generated as follows. Let $K_2=[b_0, b_1, \ldots b_N]$ be a second key of length 6N bits, where N is the quantity of subcarriers, each $b_i$ is of length 6, $b_i$ is mapped to subcarrier i, and subcarrier i is mapped to a 64 quadrature amplitude modulation (QAM) symbol $p_i$. Therefore, the derived PRS sequence $P=[p_1, p_2, \ldots p_N]$.

As shown by reference number 640, UE 520 may transmit the PRS. As shown by reference number 645, UE 530 may correlate the PRS received from UE 520 with the local PRS derived by UE 530. This correlation may include comparing the received PRS with the derived local PRS and using the result of the comparison to verify whether the range of the PRS is secure. For example, if the sequence of the received PRS matches or substantially matches the sequence of the derived local PRS, the range of the PRS may be accepted as secure, and UE 530 may treat UE 520 as a device that is authorized to transmit and/or receive remote signals (e.g., unlock, lock, remote start) to UE 530. Note that the second key $K_2$ is not shared between UE 520 and UE 530. Rather, the second key $K_2$ is independently derived by UE 520 and by UE 530. In sum, UE 530 may verify that a range of a PRS is secure if the PRS is indicative of the second key $K_2$.

In some aspects, UE 530 may compare a time of arrival (TOA) of the received PRS with the TOA predicted for the PRS. For example, UE 520 may transmit secure sequence P to UE 530 so that UE 530 may determine the range. Let P be the sequence received by UE 530 (possibly corrupted by the eavesdropper's signal and noise). UE 530 may infer or predict sequence P and correlate the received sequence $\tilde{P}$ with P to determine the TOA. The TOA may be a function of the sequence, which may be a function of the range.

In some aspects, UE 530 may transmit a TOA of the PRS from UE 520 back to UE 520, such that UE 520 is able to determine a round trip time (RTT) for the PRS. Also, UE 530 may determine a range of UE 520 based at least in part on a time of transmission of sequence P and a TOA of received sequence $\tilde{P}$.

By generating a second key $K_2$ that is based at least in part on a first key $K_1$ that indicates a changing configuration of passive devices, UE 520 and UE 530 make it difficult to spoof a range for a PRS. This increases security of a secure ranging system. In example 600, the UE 520 may more securely signal to the UE 530 and help prevent theft or internal damage to the vehicle of UE 530.

As indicated above, FIG. 6 is provided as an example. Other examples may differ from what is described with regard to FIG. 6.

Figure 7:
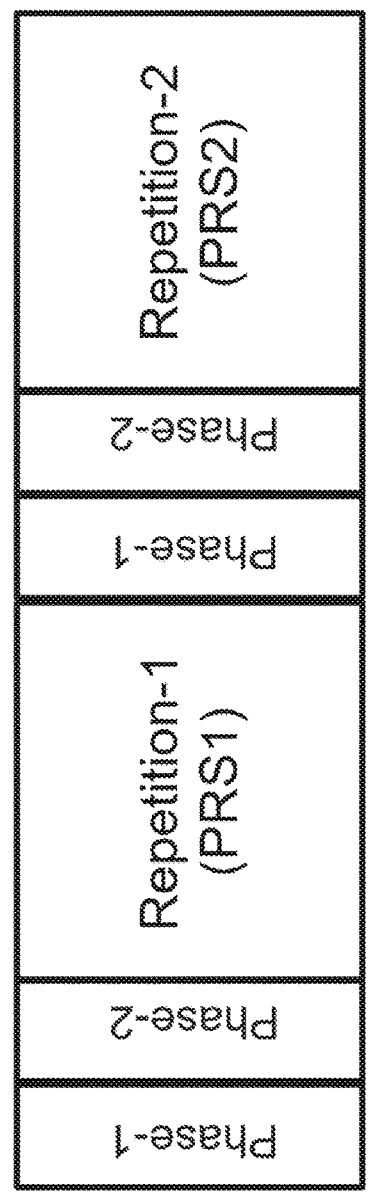
FIG. 7 is a diagram illustrating an example of using multiple instances of a second key, in accordance with the present disclosure.

FIG. 7 is a diagram illustrating an example 700 of using multiple instances of a second key, in accordance with the present disclosure.

In some aspects, to better avoid spoofing of a range of a PRS, UE 520 and UE 530 may generate and use multiple instances of the second key over time. In this way, a spoofing middle-man has to generate multiple spoofing instances correctly. Example 700 shows, for a first instance, a first layer or phase (Phase-1) to use a first key and a second layer or phase (Phase-2) to generate the second key. UE 520 may transmit the PRS (PRS1) that is indicative of the second key and transmit PRS1 at time $t_1$. In some aspects, UE 520 may transmit multiple repetitions of PRS1. For a second instance, UE 520 and UE 530 may perform the first phase and the second phase. UE 520 may transmit PRS2, which is indicative of the second key for the second instance. UE 520 may transmit multiple repetitions of PRS2. UE 520 may transmit PRS2 at time $t_1+\Delta$. Generation of the second key may extend to further independent PRS sequence derivations and consistency checks at times $\{t_1+2\Delta, \ldots t_1+n\Delta\}$. By using keys that seem to randomly change, spoofing of the PRSs will be increasingly difficult and the ranges of PRSs will be more secure.

As indicated above, FIG. 7 is provided as an example. Other examples may differ from what is described with regard to FIG. 7.

Figure 8:
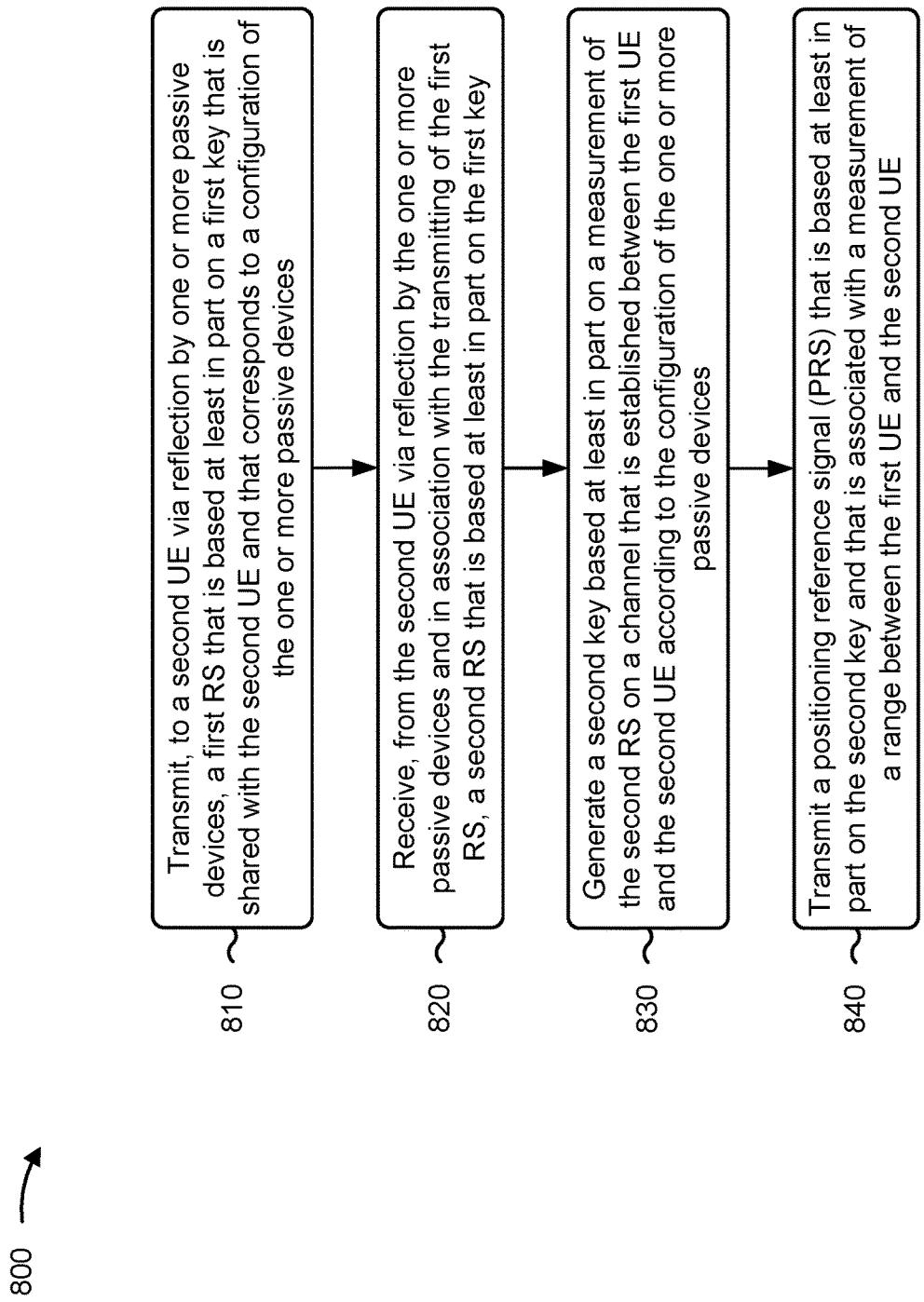
FIG. 8 is a diagram illustrating an example process performed, for example, by a first UE, in accordance with the present disclosure.

FIG. 8 is a diagram illustrating an example process 800 performed, for example, by a first UE, in accordance with the present disclosure. Example process 800 is an example where the UE (e.g., UE 120, UE 520) performs operations associated with secure ranging with passive devices.

As shown in FIG. 8, in some aspects, process 800 may include transmitting, to a second UE via reflection by one or more passive devices, a first RS that is based at least in part on a first key that is shared with the second UE and that corresponds to a configuration of the one or more passive devices (block 810). For example, the UE (e.g., using communication manager 150 and/or transmission component 1004 depicted in FIG. 10) may transmit, to a second UE via reflection by one or more passive devices, a first RS that is based at least in part on a first key that is shared with the second UE and that corresponds to a configuration of the one or more passive devices, as described above.

As further shown in FIG. 8, in some aspects, process 800 may include receiving, from the second UE via reflection by the one or more passive devices and in association with the transmitting of the first RS, a second RS that is based at least in part on the first key (block 820). For example, the UE (e.g., using communication manager 150 and/or reception component 1002 depicted in FIG. 10) may receive, from the second UE via reflection by the one or more passive devices and in association with the transmitting of the first RS, a second RS that is based at least in part on the first key, as described above.

As further shown in FIG. 8, in some aspects, process 800 may include generating a second key based at least in part on a measurement of the second RS on a channel that is established between the first UE and the second UE according to the configuration of the one or more passive devices (block 830). For example, the UE (e.g., using communication manager 150 and/or generation component 1008 depicted in FIG. 10) may generate a second key based at least in part on a measurement of the second RS on a channel that is established between the first UE and the second UE according to the configuration of the one or more passive devices, as described above.

As further shown in FIG. 8, in some aspects, process 800 may include transmitting a PRS that is based at least in part on the second key and that is associated with a measurement of a range between the first UE and the second UE (block 840). For example, the UE (e.g., using communication manager 150 and/or transmission component 1004 depicted in FIG. 10) may transmit a PRS that is based at least in part on the second key and that is associated with a measurement of a range between the first UE and the second UE, as described above.

Process 800 may include additional aspects, such as any single aspect or any combination of aspects described below and/or in connection with one or more other processes described elsewhere herein.

In a first aspect, the configuration includes a timing of when each of the one or more passive devices is active or inactive.

In a second aspect, alone or in combination with the first aspect, the configuration includes a timing of when the first UE and the second UE are to perform channel measurements.

In a third aspect, alone or in combination with one or more of the first and second aspects, a first value of the first key indicates a first combination of active passive devices and one or more time slots for the first combination when the first UE and the second UE are to perform channel measurements, and a second value of the first key indicates a second combination of active passive devices and one or more time slots for the second combination when the first UE and the second UE are to perform channel measurements.

In a fourth aspect, alone or in combination with one or more of the first through third aspects, the configuration includes a reflection configuration for at least one active passive device of the one or more passive devices.

In a fifth aspect, alone or in combination with one or more of the first through fourth aspects, process 800 includes receiving the first key from an RSU or the second UE.

In a sixth aspect, alone or in combination with one or more of the first through fifth aspects, the measurement of the second RS includes a phase or amplitude measurement for each of multiple subcarriers of the second RS during a measurement slot indicated by the first key.

In a seventh aspect, alone or in combination with one or more of the first through sixth aspects, the second key corresponds to a concatenation of multiple phase or amplitude measurements.

In an eighth aspect, alone or in combination with one or more of the first through seventh aspects, process 800 includes generating the PRS based at least in part on a mapping of PRS sequences from candidate values based at least in part on the second key.

In a ninth aspect, alone or in combination with one or more of the first through eighth aspects, the transmitting the PRS includes transmitting repetitions of the PRS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
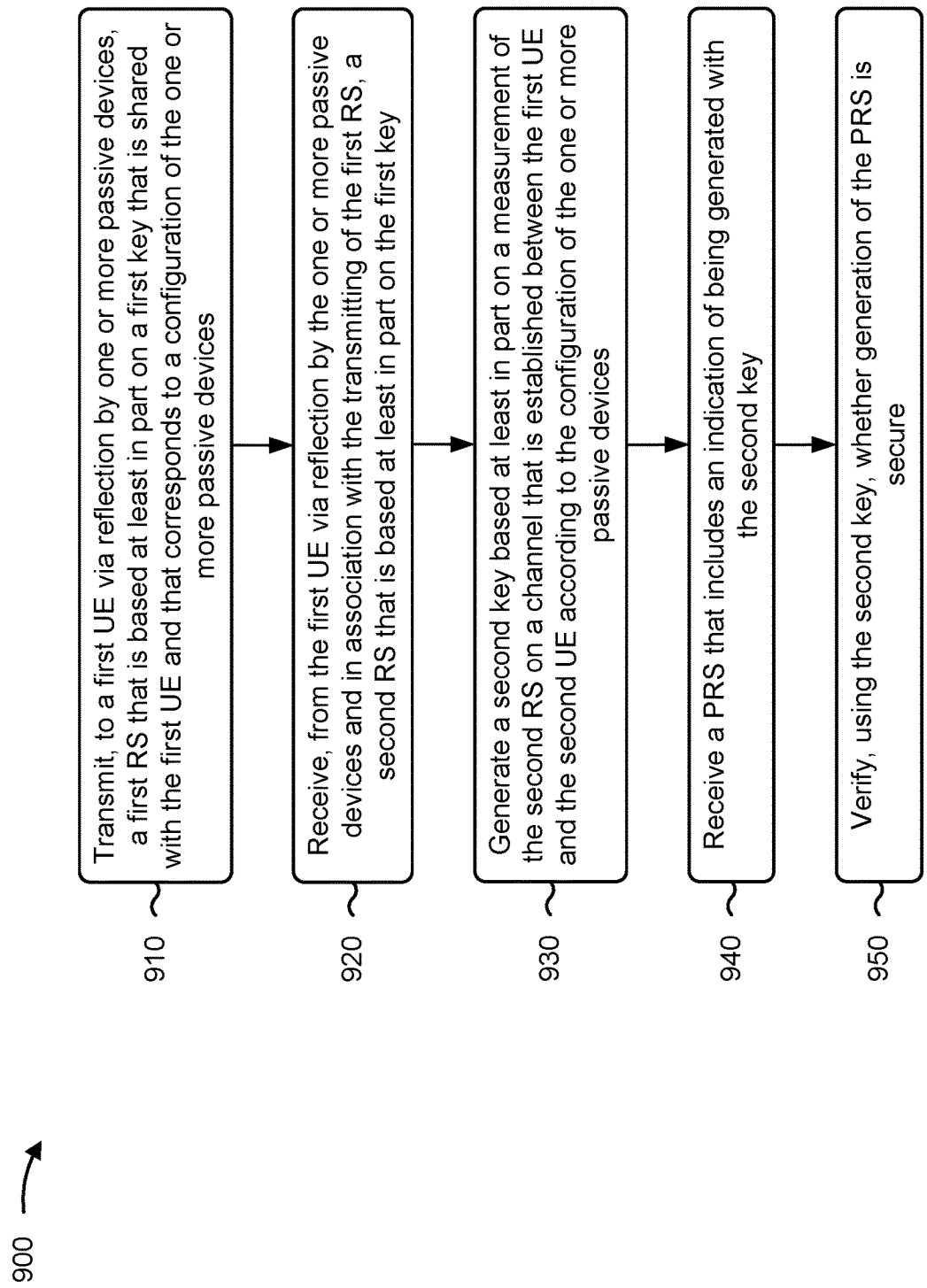
FIG. 9 is a diagram illustrating an example process performed, for example, by a second UE, in accordance with the present disclosure.

FIG. 9 is a diagram illustrating an example process 900 performed, for example, by a second UE, in accordance with the present disclosure. Example process 900 is an example where the UE (e.g., UE 120, UE 530) performs operations associated with secure ranging with passive devices.

As shown in FIG. 9, in some aspects, process 900 may include transmitting, to a first UE via reflection by one or more passive devices, a first RS that is based at least in part on a first key that is shared with the first UE and that corresponds to a configuration of the one or more passive devices (block 910). For example, the UE (e.g., using communication manager 150 and/or transmission component 1104 depicted in FIG. 11) may transmit, to a first UE via reflection by one or more passive devices, a first RS that is based at least in part on a first key that is shared with the first UE and that corresponds to a configuration of the one or more passive devices, as described above.

As further shown in FIG. 9, in some aspects, process 900 may include receiving, from the first UE via reflection by the one or more passive devices and in association with the transmitting of the first RS, a second RS that is based at least in part on the first key (block 920). For example, the UE (e.g., using communication manager 150 and/or reception component 1102 depicted in FIG. 11) may receive, from the first UE via reflection by the one or more passive devices and in association with the transmitting of the first RS, a second RS that is based at least in part on the first key, as described above.

As further shown in FIG. 9, in some aspects, process 900 may include generating a second key based at least in part on a measurement of the second RS on a channel that is established between the first UE and the second UE according to the configuration of the one or more passive devices (block 930). For example, the UE (e.g., using communication manager 150 and/or generation component 1108 depicted in FIG. 11) may generate a second key based at least in part on a measurement of the second RS on a channel that is established between the first UE and the second UE according to the configuration of the one or more passive devices, as described above.

As further shown in FIG. 9, in some aspects, process 900 may include receiving a PRS that includes an indication of being generated with the second key (block 940). For example, the UE (e.g., using communication manager 150 and/or reception component 1102 depicted in FIG. 11) may receive a PRS that includes an indication of being generated with the second key, as described above.

As further shown in FIG. 9, in some aspects, process 900 may include verifying, based on or using the second key, whether generation of the PRS is secure (block 950). For example, the UE (e.g., using communication manager 150 and/or verification component 1110 depicted in FIG. 11) may verify, based on or using the second key, whether generation of the PRS is secure, as described above.

Process 900 may include additional aspects, such as any single aspect or any combination of aspects described below and/or in connection with one or more other processes described elsewhere herein.

In a first aspect, the configuration includes a timing of when each of the one or more passive devices is active or inactive.

In a second aspect, alone or in combination with the first aspect, the configuration includes a timing of when the first UE and the second UE are to perform channel measurements.

In a third aspect, alone or in combination with one or more of the first and second aspects, a first value of the first key indicates a first combination of active passive devices and one or more time slots for the first combination when the first UE and the second UE are to perform channel measurements, and a second value of the first key indicates a second combination of active passive devices and one or more time slots for the second combination when the first UE and the second UE are to perform channel measurements.

In a fourth aspect, alone or in combination with one or more of the first through third aspects, the configuration includes a reflection configuration for at least one active passive device of the one or more passive devices.

In a fifth aspect, alone or in combination with one or more of the first through fourth aspects, process 900 includes receiving the first key from an RSU or the first UE.

In a sixth aspect, alone or in combination with one or more of the first through fifth aspects, the measurement of the second RS includes a phase or amplitude measurement for each of multiple subcarriers of the second RS during a measurement slot indicated by the first key.

In a seventh aspect, alone or in combination with one or more of the first through sixth aspects, the second key corresponds to a concatenation of multiple phase or amplitude measurements.

In an eighth aspect, alone or in combination with one or more of the first through seventh aspects, the verifying whether the generation of the PRS is secure includes determining an estimated TOA for the PRS based at least in part on the second key and comparing the estimated TOA of the PRS and an actual TOA of the PRS.

In a ninth aspect, alone or in combination with one or more of the first through eighth aspects, the verifying whether generation of the PRS is secure includes generating a local PRS based at least in part on the second key and comparing the local PRS and the PRS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
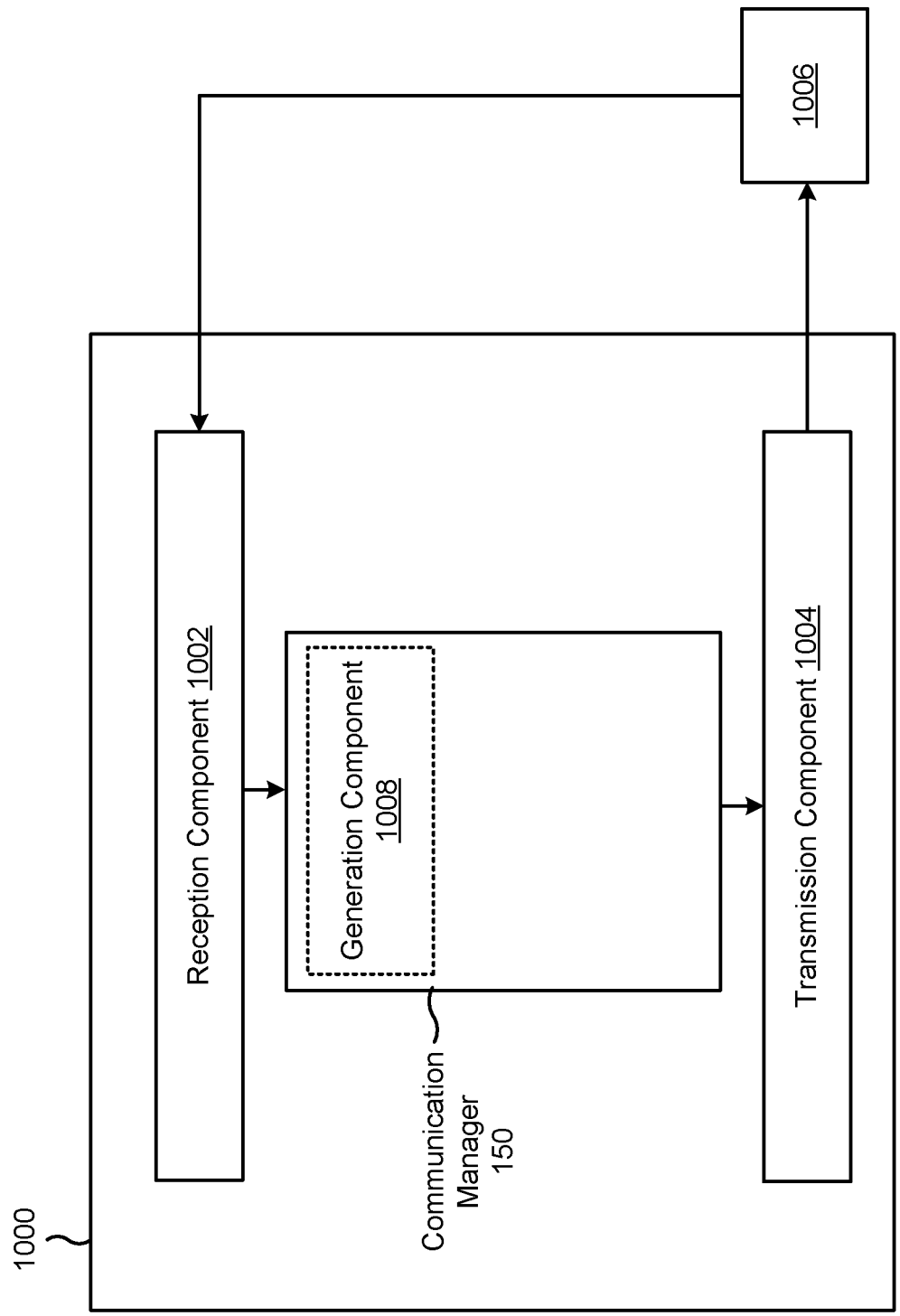
FIGS. 10-11 are diagrams of example apparatuses for wireless communication, in accordance with the present disclosure.

FIG. 10 is a diagram of an example apparatus 1000 for wireless communication. The apparatus 1000 may be a first UE (e.g., UE 120, UE 520), or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a generation component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8.

In some aspects, the apparatus 1000 and/or one or more components shown in FIG. 10 may include one or more components of the first UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first UE described in connection with FIG. 2. In some aspects, the transmission component 1004 may be co-located with the reception component 1002 in a transceiver.

The transmission component 1004 may transmit, to a second UE via reflection by one or more passive devices, a first RS that is based at least in part on a first key that is shared with the second UE and that corresponds to a configuration of the one or more passive devices. The reception component 1002 may receive, from the second UE via reflection by the one or more passive devices and in association with the transmitting of the first RS, a second RS that is based at least in part on the first key. The generation component 1008 may generate a second key based at least in part on a measurement of the second RS on a channel that is established between the first UE and the second UE according to the configuration of the one or more passive devices. The transmission component 1004 may transmit a PRS that is based at least in part on the second key and that is associated with a measurement of a range between the first UE and the second UE.

The reception component 1002 may receive the first key from a roadside unit or the second UE. The generation component 1008 may generate the PRS based at least in part on a mapping of PRS sequences from candidate values based at least in part on the second key.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
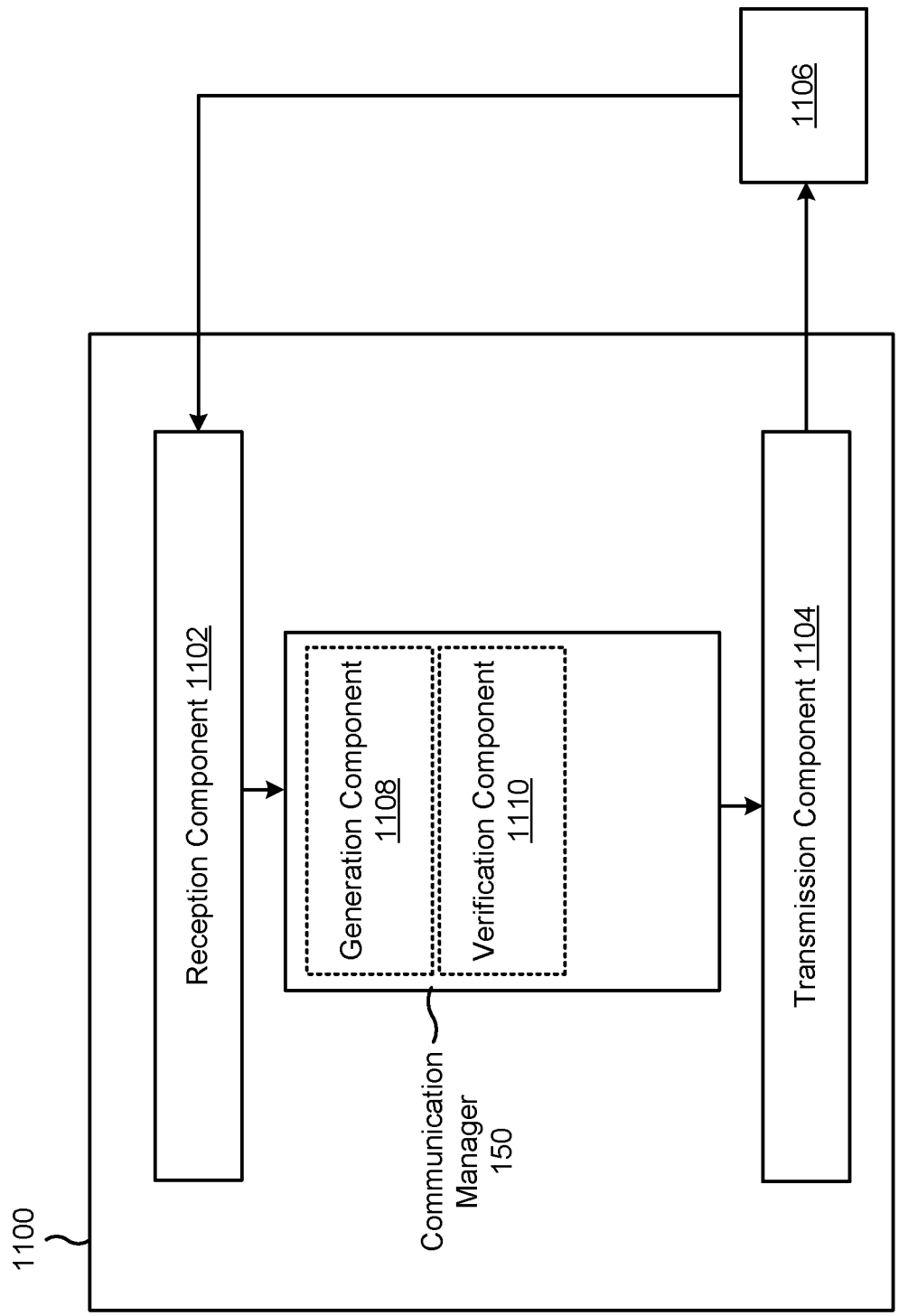

FIG. 11 is a diagram of an example apparatus 1100 for wireless communication. The apparatus 1100 may be a second UE (e.g., UE 120, UE 530), or a second UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a generation component 1108 and/or a verification component 1110, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the second UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the second UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the second UE described in connection with FIG. 2. In some aspects, the transmission component 1104 may be co-located with the reception component 1102 in a transceiver.

The transmission component 1104 may transmit, to a first UE via reflection by one or more passive devices, a first RS that is based at least in part on a first key that is shared with the first UE and that corresponds to a configuration of the one or more passive devices. The reception component 1102 may receive, from the first UE via reflection by the one or more passive devices and in association with the transmitting of the first RS, a second RS that is based at least in part on the first key. The generation component 1108 may generate a second key based at least in part on a measurement of the second RS on a channel that is established between the first UE and the second UE according to the configuration of the one or more passive devices. The reception component 1102 may receive a PRS that includes an indication of being generated with the second key. The verification component 1110 may verify, using the second key, whether generation of the PRS is secure. The reception component 1102 may receive the first key from a roadside unit or the first UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: transmitting, to a second UE via reflection by one or more passive devices, a first reference signal (RS) that is based at least in part on a first key that is shared with the second UE and that corresponds to a configuration of the one or more passive devices; receiving, from the second UE via reflection by the one or more passive devices and in association with the transmitting of the first RS, a second RS that is based at least in part on the first key; generating a second key based at least in part on a measurement of the second RS on a channel that is established between the first UE and the second UE according to the configuration of the one or more passive devices; and transmitting a positioning reference signal (PRS) that is based at least in part on the second key and that is associated with a measurement of a range between the first UE and the second UE.

Aspect 2: The method of Aspect 1, wherein the configuration includes a timing of when each of the one or more passive devices is active or inactive.

Aspect 3: The method of Aspect 2, wherein the configuration includes a timing of when the first UE and the second UE are to perform channel measurements.

Aspect 4: The method of Aspect 3, wherein a first value of the first key indicates a first combination of active passive devices and one or more time slots for the first combination when the first UE and the second UE are to perform channel measurements, and a second value of the first key indicates a second combination of active passive devices and one or more time slots for the second combination when the first UE and the second UE are to perform channel measurements.

Aspect 5: The method of Aspect 2, wherein the configuration includes a reflection configuration for at least one active passive device of the one or more passive devices.

Aspect 6: The method of any of Aspects 1-5, further comprising receiving the first key from a roadside unit or the second UE.

Aspect 7: The method of any of Aspects 1-6, wherein the measurement of the second RS includes a phase or amplitude measurement for each of multiple subcarriers of the second RS during a measurement slot indicated by the first key.

Aspect 8: The method of Aspect 7, wherein the second key corresponds to a concatenation of multiple phase or amplitude measurements.

Aspect 9: The method of any of Aspects 1-8, further comprising generating the PRS based at least in part on a mapping of PRS sequences from candidate values based at least in part on the second key.

Aspect 10: The method of any of Aspects 1-9, wherein the transmitting the PRS includes transmitting repetitions of the PRS.

Aspect 11: A method of wireless communication performed by a second user equipment (UE), comprising: transmitting, to a first UE via reflection by one or more passive devices, a first reference signal (RS) that is based at least in part on a first key that is shared with the first UE and that corresponds to a configuration of the one or more passive devices; receiving, from the first UE via reflection by the one or more passive devices and in association with the transmitting of the first RS, a second RS that is based at least in part on the first key; generating a second key based at least in part on a measurement of the second RS on a channel that is established between the first UE and the second UE according to the configuration of the one or more passive devices; receiving a positioning reference signal (PRS) that includes an indication of being generated with the second key; and verifying, based on the second key, whether generation of the PRS is secure.

Aspect 12: The method of Aspect 11, wherein the configuration includes a timing of when each of the one or more passive devices is active or inactive.

Aspect 13: The method of Aspect 12, wherein the configuration includes a timing of when the first UE and the second UE are to perform channel measurements.

Aspect 14: The method of Aspect 13, wherein a first value of the first key indicates a first combination of active passive devices and one or more time slots for the first combination when the first UE and the second UE are to perform channel measurements, and a second value of the first key indicates a second combination of active passive devices and one or more time slots for the second combination when the first UE and the second UE are to perform channel measurements.

Aspect 15: The method of Aspect 12, wherein the configuration includes a reflection configuration for at least one active passive device of the one or more passive devices.

Aspect 16: The method of any of Aspects 11-15, further comprising receiving the first key from a roadside unit or the first UE.

Aspect 17: The method of any of Aspects 11-16, wherein the measurement of the second RS includes a phase or amplitude measurement for each of multiple subcarriers of the second RS during a measurement slot indicated by the first key.

Aspect 18: The method of Aspect 17, wherein the second key corresponds to a concatenation of multiple phase or amplitude measurements.

Aspect 19: The method of any of Aspects 11-18, wherein the verifying whether the generation of the PRS is secure includes: determining an estimated time of arrival (TOA) for the PRS based at least in part on the second key; and comparing the estimated TOA of the PRS and an actual TOA of the PRS.

Aspect 20: The method of any of Aspects 11-19, wherein the verifying whether generation of the PRS is secure includes: generating a local PRS based at least in part on the second key; and comparing the local PRS and the PRS.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" or "controller" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   memory; and
   one or more processors coupled to the memory, the memory comprising instructions executable by the one or more processors to cause the first UE to:
   transmit, to a second UE via reflection by one or more passive devices, a first reference signal (RS) that is based at least in part on a first key that is shared with the second UE and that corresponds to a configuration of the one or more passive devices wherein the configuration includes a timing of when each of the one or more passive devices is active or inactive;
   receive, from the second UE via reflection by the one or more passive devices and in association with the transmitting of the first RS, a second RS that is based at least in part on the first key;
   generate a second key based at least in part on a measurement of the second RS on a channel that is established between the first UE and the second UE according to the configuration of the one or more passive devices; and
   transmit a positioning reference signal (PRS) that is based at least in part on the second key and that is associated with a measurement of a range between the first UE and the second UE.

2. The first UE of claim 1, wherein the configuration includes a timing of when the first UE and the second UE are to perform channel measurements.

3. The first UE of claim 2, wherein a first value of the first key indicates a first combination of active passive devices and one or more time slots for the first combination when the first UE and the second UE are to perform channel measurements, and a second value of the first key indicates a second combination of active passive devices and one or more time slots for the second combination when the first UE and the second UE are to perform channel measurements.

4. The first UE of claim 1, wherein the configuration includes a reflection configuration for at least one active passive device of the one or more passive devices.

5. The first UE of claim 1, wherein the memory further comprises instructions executable by the one or more processors to cause the first UE to receive the first key from a roadside unit or the second UE.

6. The first UE of claim 1, wherein the measurement of the second RS includes a phase or amplitude measurement for each of multiple subcarriers of the second RS during a measurement slot indicated by the first key.

7. The first UE of claim 6, wherein the second key corresponds to a concatenation of multiple phase or amplitude measurements.

8. The first UE of claim 1, wherein the memory further comprises instructions executable by the one or more processors to cause the first UE to generate the PRS based at least in part on a mapping of PRS sequences from candidate values based at least in part on the second key.

9. The first UE of claim 1, wherein the transmitting the PRS includes transmitting repetitions of the PRS.

10. A second user equipment (UE) for wireless communication, comprising:
    memory; and
    one or more processors coupled to the memory, the memory comprising instructions executable by the one or more processors to cause the second UE to:
    transmit, to a first UE via reflection by one or more passive devices, a first reference signal (RS) that is based at least in part on a first key that is shared with the first UE and that corresponds to a configuration of the one or more passive devices, wherein the configuration includes a timing of when each of the one or more passive devices is active or inactive;

receive, from the first UE via reflection by the one or more passive devices and in association with the transmitting of the first RS, a second RS that is based at least in part on the first key;

generate a second key based at least in part on a measurement of the second RS on a channel that is established between the first UE and the second UE according to the configuration of the one or more passive devices;

receive a positioning reference signal (PRS) that includes an indication of being generated with the second key; and verify, based on the second key, whether generation of the PRS is secure.

11. The second UE of claim 10, wherein the configuration includes a timing of when the first UE and the second UE are to perform channel measurements.

12. The second UE of claim 11, wherein a first value of the first key indicates a first combination of active passive devices and one or more time slots for the first combination when the first UE and the second UE are to perform channel measurements, and a second value of the first key indicates a second combination of active passive devices and one or more time slots for the second combination when the first UE and the second UE are to perform channel measurements.

13. The second UE of claim 10, wherein the configuration includes a reflection configuration for at least one active passive device of the one or more passive devices.

14. The second UE of claim 10, wherein the memory further comprises instructions executable by the one or more processors to cause the second UE to receive the first key from a roadside unit or the first UE.

15. The second UE of claim 10, wherein the measurement of the second RS includes a phase or amplitude measurement for each of multiple subcarriers of the second RS during a measurement slot indicated by the first key.

16. The second UE of claim 15, wherein the second key corresponds to a concatenation of multiple phase or amplitude measurements.

17. The second UE of claim 10, wherein the instructions, executable to cause the second UE to verify whether the generation of the PRS is secure, are executable to cause the second UE to:
determine an estimated time of arrival (TOA) for the PRS based at least in part on the second key; and
compare the estimated TOA of the PRS and an actual TOA of the PRS.

18. The second UE of claim 10, wherein the instructions, executable to cause the second UE to verify whether generation of the PRS is secure, are executable to cause the second UE to:
generate a local PRS based at least in part on the second key; and
compare the local PRS and the PRS.

19. A method of wireless communication performed by a first user equipment (UE), comprising:
transmitting, to a second UE via reflection by one or more passive devices, a first reference signal (RS) that is based at least in part on a first key that is shared with the second UE and that corresponds to a configuration of the one or more passive devices, wherein the configuration includes a timing of when each of the one or more passive devices is active or inactive;

receiving, from the second UE via reflection by the one or more passive devices and in association with the transmitting of the first RS, a second RS that is based at least in part on the first key;

generating a second key based at least in part on a measurement of the second RS on a channel that is established between the first UE and the second UE according to the configuration of the one or more passive devices; and transmitting a positioning reference signal (PRS) that is based at least in part on the second key and that is associated with a measurement of a range between the first UE and the second UE.

20. The method of claim 19, wherein the configuration includes a timing of when the first UE and the second UE are to perform channel measurements.

21. The method of claim 19, wherein the configuration includes a reflection configuration for at least one active passive device of the one or more passive devices.

22. The method of claim 19, wherein the measurement of the second RS includes a phase or amplitude measurement for each of multiple subcarriers of the second RS during a measurement slot indicated by the first key.

23. The method of claim 19, further comprising generating the PRS based at least in part on a mapping of PRS sequences from candidate values based at least in part on the second key.

24. A method of wireless communication performed by a second user equipment (UE), comprising:
transmitting, to a first UE via reflection by one or more passive devices, a first reference signal (RS) that is based at least in part on a first key that is shared with the first UE and that corresponds to a configuration of the one or more passive devices, wherein the configuration includes a timing of when each of the one or more passive devices is active or inactive;

receiving, from the first UE via reflection by the one or more passive devices and in association with the transmitting of the first RS, a second RS that is based at least in part on the first key;

generating a second key based at least in part on a measurement of the second RS on a channel that is established between the first UE and the second UE according to the configuration of the one or more passive devices;

receiving a positioning reference signal (PRS) that includes an indication of being generated with the second key; and verifying, based on the second key, whether generation of the PRS is secure.

25. The method of claim 24, wherein the configuration includes a timing of when the first UE and the second UE are to perform channel measurements.

26. The method of claim 24, wherein the verifying whether the generation of the PRS is secure includes:
determining an estimated time of arrival (TOA) for the PRS based at least in part on the second key; and
comparing the estimated TOA of the PRS and an actual TOA of the PRS.

27. The method of claim 24, wherein the verifying whether generation of the PRS is secure includes:
generating a local PRS based at least in part on the second key; and
comparing the local PRS and the PRS.

* * * * *